United States Patent [19]  
Funaki et al.

[11] Patent Number: 4,874,654
[45] Date of Patent: Oct. 17, 1989

[54] VEHICLE WINDOW GLASS

[75] Inventors: Masaaki Funaki; Koki Kunihiro; Yutaka Ichinomiya, all of Osaka, Japan

[73] Assignee: Nippon Sheet Glass Co., Ltd., Osaka, Japan

[21] Appl. No.: 203,223

[22] Filed: Jun. 6, 1988

[30] Foreign Application Priority Data

Jun. 15, 1987 [JP] Japan .................. 62-91649[U]

[51] Int. Cl.⁴ .................... B32B 3/00; B32B 3/02
[52] U.S. Cl. ........................ 428/192; 428/34; 428/49; 428/212; 428/220; 428/332; 428/338; 428/411.1; 428/412; 428/432; 428/46; 296/84.1; 296/96.19
[58] Field of Search ............ 296/84.1, 96.19; 428/432, 192, 49, 212, 220, 332, 412, 411.1, 338

[56] References Cited

U.S. PATENT DOCUMENTS

| | | | |
|---|---|---|---|
| 3,198,650 | 5/1960 | Stilley et al. | 428/432 |
| 3,244,547 | 5/1955 | Orr et al. | 428/432 |
| 3,455,722 | 1/1967 | Kushihashi | 428/432 |
| 3,652,370 | 3/1972 | Motai | 428/332 |
| 3,922,456 | 11/1975 | Baldridge | 428/213 |
| 4,082,894 | 4/1978 | Yoshida | 428/335 |
| 4,244,997 | 1/1981 | Postupack | 428/174 |
| 4,427,743 | 1/1984 | Katsuki et al. | 428/412 X |
| 4,522,966 | 6/1985 | Funaki et al. | 428/412 |
| 4,554,199 | 11/1985 | Roentgen et al. | 428/194 |
| 4,555,434 | 11/1985 | Kunert | 428/194 |
| 4,715,804 | 12/1987 | Takahashi | 425/141 |

FOREIGN PATENT DOCUMENTS

| | | | |
|---|---|---|---|
| 666343 | 7/1963 | Canada | 296/84.1 |
| 735187 | 5/1966 | Canada | 428/432 |
| 6603622 | 3/1966 | Netherlands | 428/34 |
| 878431 | 9/1961 | United Kingdom | 296/84.1 |

Primary Examiner—Ellis P. Robinson
Assistant Examiner—Archene A. Turner
Attorney, Agent, or Firm—Kanesaka and Takeuchi

[57] ABSTRACT

A vehicle window glass composed of a transparent part and a colored part formed on the periphery of the transparent part by the multi-color molding method.

A method for producing a vehicle window glass by forming a colored part on the periphery of the transparent part by the multi-color molding method, characterized in that at least one cycle of injection molding for the multi-color molding is accomplished by injection-compression molding.

A vehicle window glass composed of a transparent part and a peripheral colored part, characterized in that transparent part gradually thins out toward the periphery at the boundary between the transparent part and the colored part.

16 Claims, 9 Drawing Sheets

FIG.10

VEHICLE WINDOW GLASS

FIELD OF THE INVENTION AND RELATED ART STATEMENT

The present invention relates to a vehicle window glass and a method for producing the same. More particularly, it is concerned with a vehicle window glass having an improved peripheral masking part and a method for producing the same.

Figure 2:
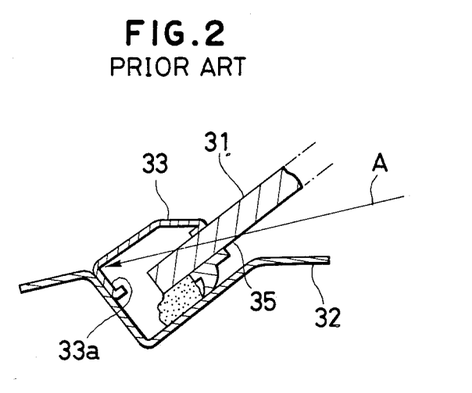
FIG. 2 is a sectional view illustrating the mount for an automotive windshield.

Usually, the automotive windshield 31 is mounted, with its bottom part fixed to the dashboard 32 by means of the molding 33, as shown in FIG. 2. In most cases, the inside 33a of the molding 33 is not clean because scratches resulting from forming and stains resulting from foil bonding are left unremoved. The unclean inside 33a of the molding 33 is visible to the driver through the clear windshield 31; therefore, it is harmful to the appearance of the front part of an automobile.

Figure 4A:
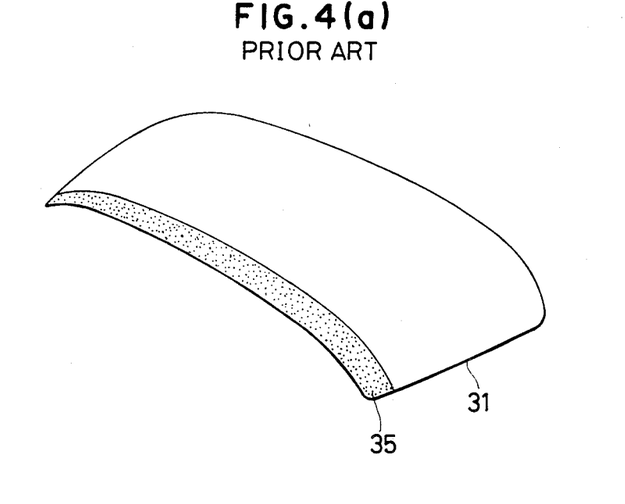
FIG. 4(a) is a perspective view of an automotive windshield.
Figure 4B:
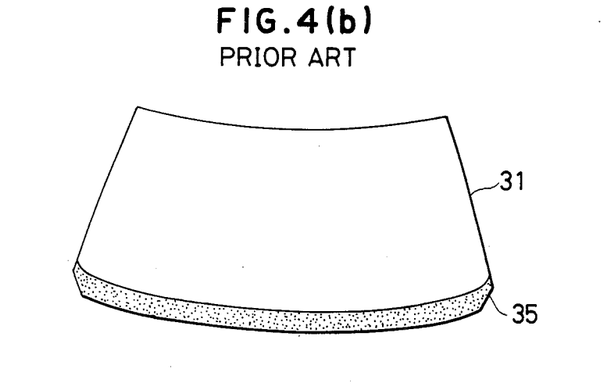
FIG. 4(b) is a front view of an automotive windshield.

It has been a conventional practice to attach the masking 35 to the lower or entire periphery of the windshield 31 so that the inside 33a of the molding 33 is concealed from the driver's eyes (in the direction of arrow A), as shown in FIG. 4(a) (perspective view) and FIG. 4(b) (front view).

Heretofore, this kind of masking has been made by smoke coating on the inorganic windshield glass. Unfortunately, the coloring of inorganic glass is very difficult technically and also expensive.

In the case of organic windshield glass which is an injection molded article having hard coating or a sheet molded article having a sharp bending portion, the masking is formed according to the following five steps.

(1) The glass surface is masked with masking tape and masking paper except the area where the desired making is made.

(2) The surface for masking is roughened with sandpaper or sand blasting.

(3) The surface for masking is coated with spraying.

(4) The coating is baked in a drying oven.

(5) After cooling, the masking tape and paper are carefully removed.

In the case of organic windshield glass which is a sheet-molded article having a slight or no bending portion, the coating is applied by screen printing as in the case of ordinary glass masking and the coated glass undergoes the above-mentioned steps (4) and (5).

The conventional masking method consisting of the above-mentioned five steps has many drawbacks. It needs many steps. It is poor in productivity and workability. It needs great skill in pasting and removing the masking tape. The resulting masking often has a blurred boundary and is subject to peeling on account of the poor adhesion of the masking material to the hard coating surface.

The masking method by screen printing is slightly better in productivity. Nevertheless, the coating step for masking is still a big technical and economical problem in the production of windshields.

OBJECTS AND SUMMARY OF THE INVENTION

It is an object of the present invention to provide a vehicle window glass which can be produced efficiently and economically and is free of the above-mentioned drawbacks involved in the prior art technology.

It is another object of the present invention to provide a vehicle window glass which is not troubled by the peeling of the coating film and hence has good durability.

It is further object of the present invention to provide a good-looking vehicle window which has a smooth boundary of the masking part.

It is still further object of the present invention to provide a method for producing the above-mentioned vehicle window glass efficiently with high accuracy.

It is further object of the present invention to provide vehicle window glass which has no sink marks at the boundary between the transparent part and the colored part.

The vehicle window glass pertaining to the present invention comprises transparent organic glass forming the central part and colored glass forming the peripheral colored part, said two parts being integrally formed by the multi-color molding method.

The method for producing the vehicle window glass pertaining to the present invention is characterized in that at least one cycle of injection molding for the multi-color molding is accomplished by injection-compression molding.

In addition, the vehicle window glass pertaining to the present invention comprises transparent glass forming the central part and colored glass forming the peripheral part, said transparent glass gradually thinning out toward the periphery at the part where the transparent glass and the colored glass join.

DETAILED DESCRIPTION OF THE PREFERRED EMBODIMENTS

Figure 1A:
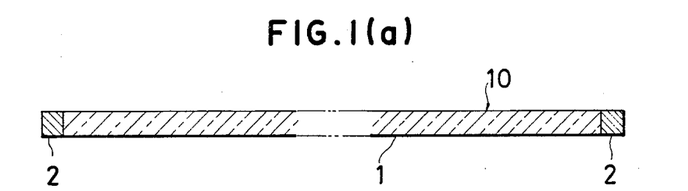
FIGS. 1(a) to 1(g) are schematic sectional views showing an example of the vehicle window glass of the present invention.
Figure 1B:
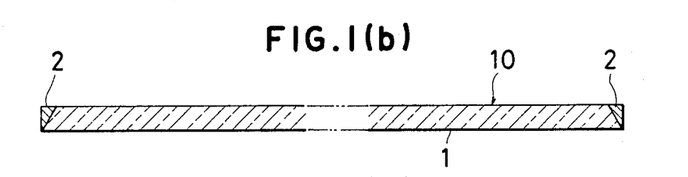
Figure 1C:
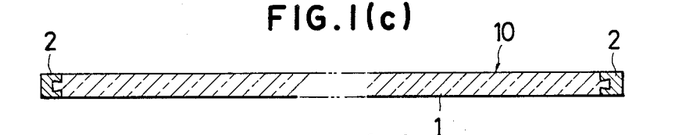
Figure 1D:
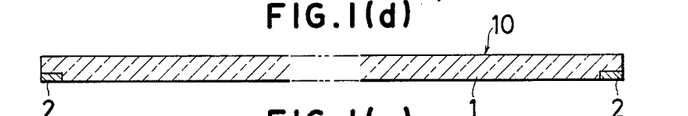
Figures 1E, 1F:
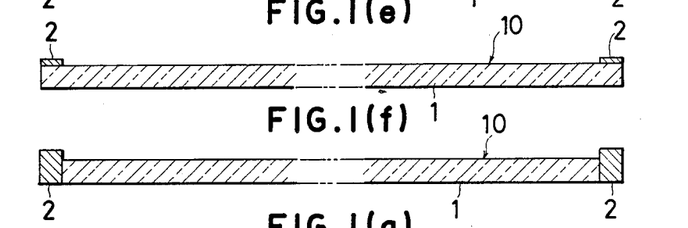
Figure 1G:
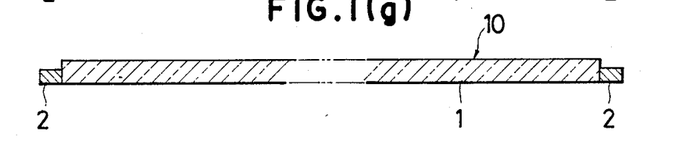

The invention will be described in more detail with reference to the accompanying drawings An embodiment of the vehicle window glass of the present invention is schematically shown in section in FIGS. 1(a) to 1(g). The vehicle window glass 10 is made of organic glass, and it is composed of the transparent part 10 and the peripheral colored part 2 formed by multi-color molding method. According to the present invention, the colored part 2 constitutes the periphery of the window glass 10, and it may have any sectional configuration. For example, it may be rectangular, triangular, or U-shaped as shown in FIGS. 1(a) to 1(c). The colored part may be formed on only one side of the window glass as shown in FIG. 1(d), in which case the colored part 2 looks like crystal glass on account of the transparent part 1 covering it. The colored part 2 may be formed flush with the transparent part 1 as shown in FIGS. 1(a) to 1(d); and it may also be formed such that it partly or entirely projects from the transparent part 1, as shown in FIGS. 1(e) to 1(g).

The multi-color molding method employed in the present invention may be accomplished basically according to the conventional one; however, it is desirable to properly establish the mold structure and molding conditions so that the resulting window glass meets requirements for vehicle use. The colored part 2 can be given a desired configuration by changing the mold design.

In the case where the multi-color molding is accomplished by injection molding in the production of the vehicle window glass of the present invention, it is a common practice to mold the transparent part first and then mold the colored part. However, this order may be reversed depending on the configuration and masking structure of the window glass.

According to the present invention, the transparent part may be produced from thermoplastic resins such as polycarbonate, acrylic resin, ABS (acrylonitrile-butadiene-styrene) resin, and AS (acrylonitrile-styrene) resin, which are preferred on account of their ease of molding. However, the transparent part may also be produced from a thermosetting resin.

According to the present invention, the colored part may be produced from a variety of colored resins. From the standpoint of compatibility (joint and adhesion at the time of molding and integrity after molding), it is desirable to use a colored resin which is prepared by coloring the resin selected for the transparent part. Needless to say, it is also possible to use a general-purpose resin colored with a proper pigment. Polyethylene resin and vinyl chloride resin are preferable for the colored part on account of their low price.

The vehicle window glass of the present invention can be applied to the windshields, rear windows, side windows, quarter windows, and roof windows of motor vehicles (passenger cars, trucks, etc.), electric cars, and a variety of vehicles. It can also be applied to the tail lens. Usually it measures 150 cm by 150 cm or less; but it may be larger than this size. It has a thickness of 2 to 8 mm, especially 4 to 8 mm.

Figure 3:
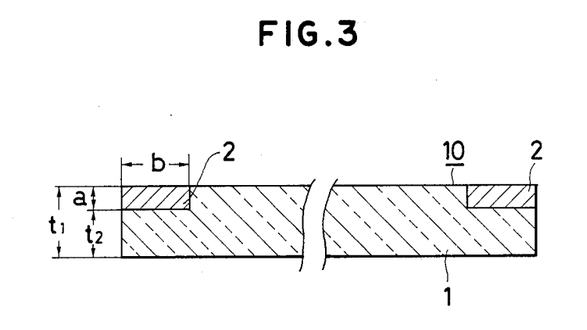
FIG. 3 is a schematic sectional view showing the vehicle window glass of the present invention.

The dimensions of the colored part should be properly determined according to the configuration, size, and use of the window glass and, the object of the colored part. In the case of a windshield 10 having a thickness ($t_1$) of 2 to 8 mm, as shown in FIG. 3, the colored part has the size specified by a and b where $a = 0.5 \sim 2$ mm and $b = 5 \sim 50$ mm (preferably $5 \sim 30$ mm).

Usually, the colored part is formed on the entire periphery of the window glass and it is in the form of a narrow, long strip. In some cases, however, it may be formed on a part of the periphery, for example, on the lower part of the periphery. In other words, the colored part may be formed on any part of the window glass to conceal any objects which should not be visible. Therefore, the colored part may be formed only on the lower part of the periphery or on the lower part and side parts of the periphery.

The vehicle window glass of the present invention may be provided with hard coating in the usual way. The adhesion of hard coating is excellent, and the hard coating provides good adhesion for the masking material.

The window glass of the present invention is schematically shown flat in FIGS. 1(a) to 1(g) and FIG. 3; however, it can be curved as shown in FIG. 4.

The multi-color molding method used in the present invention may be applied not only to the masking of the periphery of the window glass but also to the marking and garnishing. In the latter case, the mark and garnish may be formed separately from or integrally with the periphery of the window glass.

According to the multi-color molding method, it is possible to make the transparent part and the colored part (masking) at the same time. This eliminates the coating step and hence improves the productivity and lowers the production cost. Moreover, the thus formed masking does not peel off unlike coated one, and hence it has good durability.

The vehicle window glass of the present invention has the following features.

(1) The transparent part and the colored part (masking) are formed integrally. This eliminates the coating step and hence improves the productivity and lowers the production cost to a great extent.

(2) The masking part does not peel off because it is not formed by coating. This leads to good durability.

(3) The masking part has a smooth boundary which looks nice.

In the meantime, there is an instance where it is difficult to transfer the configuration of the mold exactly when the colored part is formed on the periphery of the transparent part by the multi-color molding method. The reasons for this are explained below.

(1) In the case of two-color molding, the two molding materials differ in shrinkage and cooling time (i.e., the second molding material is cooled later). This leads to the deformation at the time of demolding.

(2) The two-color molding causes great internal residual stress, which deforms the window glass at the time of post-treatment such as the baking of hard coating.

Figure 5A:
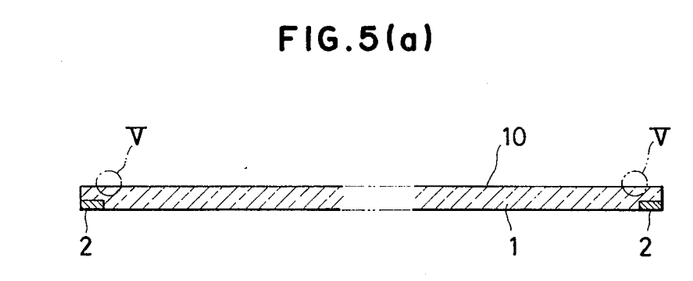
FIGS. 5(a) and 5(b) are sectional views of a window glass in which strain occurs.
Figure 5B:
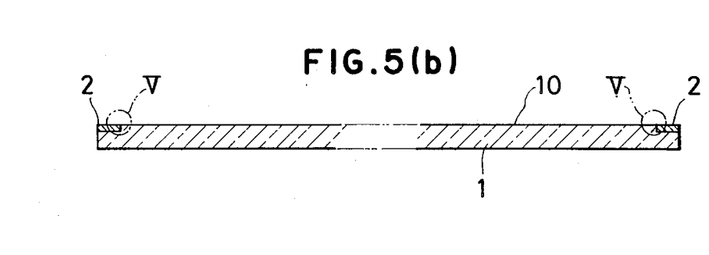

(3) In the case where the primary molding differs from the secondary molding in thickness, the resulting product is subject to sink marks and warpage caused by difference in shrinkage. Thus the mold configuration is not reproduced accurately. For example, a vehicle window glass 10 tends to deform as shown in FIGS. 5(a) and 5(b).

The deformation distorts the vision at the boundary V between the transparent part 1 and the colored part 2.

An additional disadvantage of the multi-color molding is a great residual stress remaining at the gate of the injection molded article. This residual stress would cause cracking near the gate when the hard coating is applied. (The occurrence of cracking depends on the type of hard coating material and the conditions of application.) Moreover, the secondary injection molding exerts a great pressure on the gate, deforming the primary molding. This deformation distorts reflection and vision at the boundary between the primary molding and the secondary molding.

According to the present invention, the above-mentioned disadvantage in multi-color molding for the vehicle window glass composed a transparent organic glass and a colored peripheral part can be eliminated by replacing at least one cycle of injection molding by injection-compression molding.

The multi-color molding used in the present invention may be accomplished basically according to the conventional manner. However, due consideration should be paid to the mold design and molding conditions so that the resulting vehicle window glass has the desired quality. In the case where the vehicle window glass is produced by injection molding according to the multi-color molding of the present invention, usually the transparent part is formed first and then the colored part is formed. However, the colored part may be formed first, depending on the shape of the window glass and the structure of the masking.

The method of the present invention is characterized in that at least one cycle of injection molding for the multi-color molding is carried out by injection-compression molding.

The method of the present invention may be effectively practiced by adding the compression step to the conventional multi-color molding which employs the reversing stand. According to the present invention, the compression step should be carried out for at least one cycle of injection molding. It is also possible to use the compression step for all the cycles of injection molding, and this contributes to the more improved quality.

In the case of two-color molding, the compression may be applied to the primary molding cycle alone, the secondary molding cycle alone, or both of the primary and secondary molding cycles. In general, compression is applied to the transparent part of the window glass (which is usually made by the primary molding) to produce a good effect; however, it is also possible to apply compression to the secondary molding if there is a possibility that the primary molding is deformed by the injection pressure for the secondary molding and also there is a possibility of short shot in the secondary molding.

The method for injection-compression is not specifically limited; however, it is determined according to the size of the molded article. In the case of comparatively small molded articles, the mold should be filled completely with a resin, with a compression allowance being 5-10% of the section thickness of the molded article. The compression allowance may be maintained by the oil blocking or mechanical blocking. It is also possible to employ the so-called two-stage mold clamping method instead of providing the compression allowance before hand. According to this method, injection molding is carried out, with the mold loosely clamped, so that the movable half is retracted by the injection pressure until the desired compression allowance is obtained.

Figure 6A:
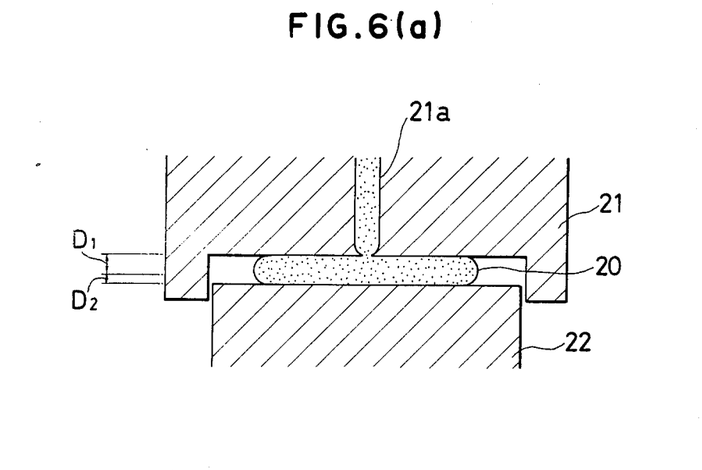
FIGS. 6(a) and 6(b) are partially sectional views of the mold used for method of the present invention.
Figure 6B:
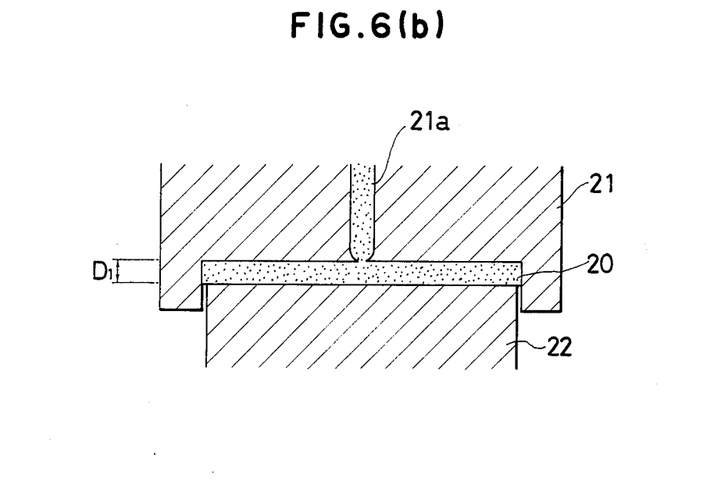

On the other hand, in the case of comparatively large molded articles, the compression allowance ($D_2$) should be large enough for the section thickness ($D_1$) of the molded article, as shown in FIG. 6(a), because the resin does not readily flow in the mold cavity. If the molded article is small enough for the resin to flow freely, the mold cavity is completely filled with the resin when the injection cycle is completed. By contract, if the molded article is so large that the resin does not flow freely, the mold cavity is not filled with the resin when the injection cycle is completed, as shown in FIG. 6(a), in which there are shown the mold halves 21 and 22 and the resin 20. Even in such a case, the compression allowance ($D_2$) expands the flow channel, improving the flowability of the resin. As the resin 20 is injected into the mold cavity through the nozzle 21a, the pressure on the resin 20 is relieved and balanced with the atmospheric pressure. Then the injected resin undergoes compression. Since the injected resin is still flowable, it fills the mold cavity completely before it cools and solidifies, as shown in FIG. 6(b). Thus there is obtained a molded article having a uniform thin section thickness. This method is advantageous for large molded articles.

The injection-compression cycle should preferably be performed for the primary injection rather than the secondary injection for the colored part from the standpoint of equipment.

The actual molding method and molding conditions vary depending on the resin material used. Two-color molding with polycarbonate may be performed under the following conditions using a special injection molding machine (Model KS-2C-680, made by Takahashi Seiki Kogyosho) which can produce a two-color molded article in one cycle.

Resin temperature: 270°~330° C.
Average in-mold pressure: 350~800 kg/cm$^2$
Mold temperature: 80°~120° C.

According to the injection-compression used in the present invention, it is possible to fill the mold cavity completely at the initial stage of injection because injection is carried out, with the mold opened. After the injection cycle, the injected resin is compressed. This method makes it possible to produce a thin molded articles which cannot be produced by the ordinary injection molding. In addition, the resulting molded article has only a little internal residual strain because uniform pressure is applied all over the molded article.

For this reason, the method of the present invention produces the following effects.

(1) It provides a molded article which retains the originally intended shape.

(2) It provides a molded article which has an accurate surface on account of uniform sink and shrinkage.

(3) It provides a molded article which has very little distortion of vision at the boundary between the transparent part and the colored part.

(4) It provides a molded article which does not crack at the time of hard coating treatment.

According to the method of the present invention, the mold is filled with a molding resin, with the mold opened, and this keeps the molding resin fluid sufficiently and permits the mold to be filled completely These features lead to the following effects.

(1) It is possible to produce a large molded article.

(2) It is possible to use a high-viscosity material.

(3) It is possible to produce a thin-wall molded article.

(4) It is possible to produce a molded article which has no anisotropic variation in strength and shrinkage.

(5) It is possible to perform the molding at a low pressure.

(6) It is possible to perform the molding at a low temperature.

In addition, the method of the present invention produces the following effect because a uniform pressure is applied all over the molded article and the resulting molded article has a very little internal strain.

(1) The molded article retains its originally intended configuration.

(2) The molded article is very little subject to sink and shrinkage, and this eliminates the distortion of vision.

(3) The molded article is not subject to cracking at the time of hard coating treatment.

(4) The molded article is provided with the masking part which can be designed with less limitations.

Therefore, according to the method of the present invention, it is possible to produce efficiently and economically a good-looking vehicle window glass having good durability and high performance.

There is an instance where the vehicle window glass produced according to the method of the present invention causes distorted reflection and distorted vision. For example, if a vehicle window glass 10 as shown in FIG. 1(d) is produced by the multi-color molding method in which the transparent part 1 is formed by the primary molding and the colored part 2 is formed by the secondary molding, sink occurs along the boundary between the transparent part 1 and the colored part 2 because of the difference in shrinkage between the two parts. This is noticeable when the thickness $T_1$ greatly differs from the thickness $T_2$, as shown in FIG. 3. It is this sink which causes distorted reflection and distorted vision.

In an embodiment of the present invention, the vehicle window glass has the peripheral colored part which is formed such that the transparent part gradually thins out toward the periphery at the boundary between the transparent part and the colored part. Some of such embodiments are schematically shown in section in FIGS. 7(a) to 7(l). It should be noted that the vehicle window glass 10 is composed of the transparent part 1 and the peripheral colored part 2, with the transparent part gradually thinning out toward the periphery at the boundary between the transparent part and the colored part.

Figure 7A:
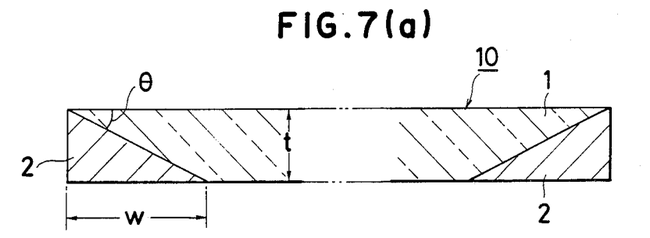
FIGS. 7(a) to 7(l) are schematic sectional views illustrating an example of the vehicle window glass of the present invention.
Figure 7B:
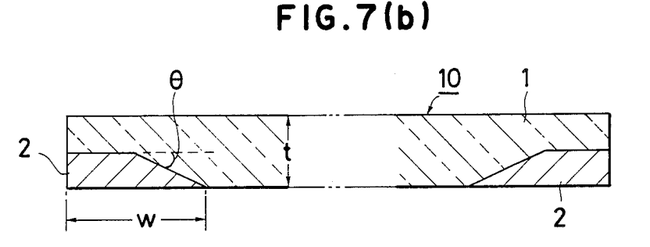
Figure 7C:
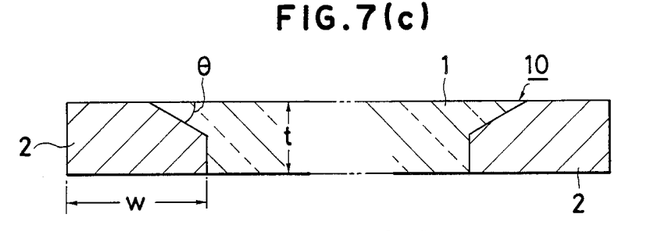
Figure 7D:
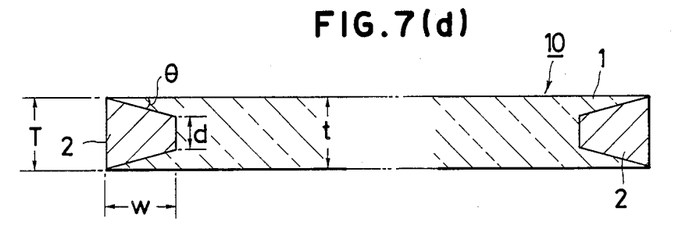
Figure 7E:
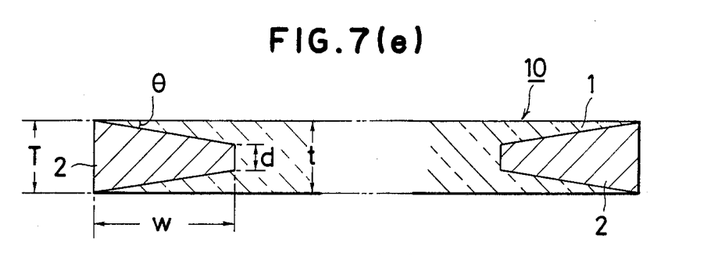
Figure 7F:
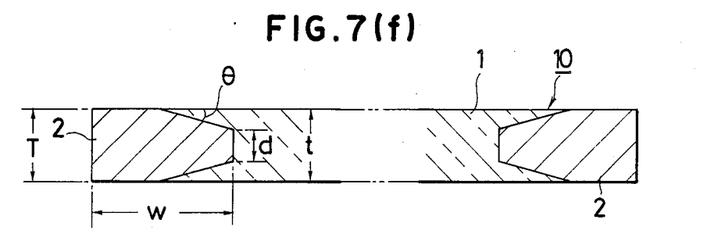
Figure 7G:
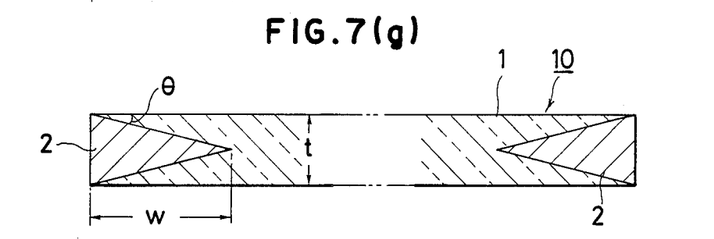

According to the present invention, the colored part 2 is not specifically limited in its sectional configuration so long as it is within the scope of the invention. For example, it may have a triangular shape as shown in FIGS. 7(a) and 7(g), a trapezoidal shape, with the base being flush with the surface of the window glass as shown in FIG. 7(b), a pentagonal shape as shown in FIG. 7(c), a trapezoidal shape, with the base being the edge of the window glass, as shown in FIGS. 7(d) and 7(e), or a hexagonal shape as shown in FIG. 7(f). Moreover, the colored part 2 may be formed such that a portion of it protrudes from the transparent glass, as shown in FIGS. 7(h) to 7(k), or such that it covers the edge of the transparent glass, as shown in FIG. 7(l). Incidentally, in the embodiments shown in FIGS. 7(a) to 7(c) and 7(h) to 7(l), the colored part may be formed on either side of the window glass.

The window glass of the present invention may have other structure than that shown in FIGS. 7(a) to 7(l). In the case of structure shown in FIGS. 7(a) to 7(k), the colored part 2 covered by the transparent glass 1 assumes a good appearance like crystal glass. This contributes to the improved appearance of the product. If the colored part 2 is made of a smoke (translucent) resin, the boundary between the transparent part 1 and the colored part 2 is blurred, with the density of the colored part gradually increasing toward the periphery. This imparts a unique depth and quality image to the window glass and permits a variety of design.

The embodiment of the present invention as shown in FIG. 7(e) is very desirable because it is superior from the standpoint of design and it is free of sink on account of the broad bonding area for the transparent part 1 and the colored part 2.

Figure 7H:
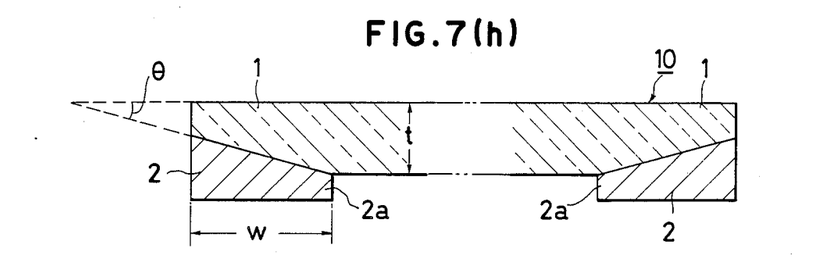
Figure 7I:
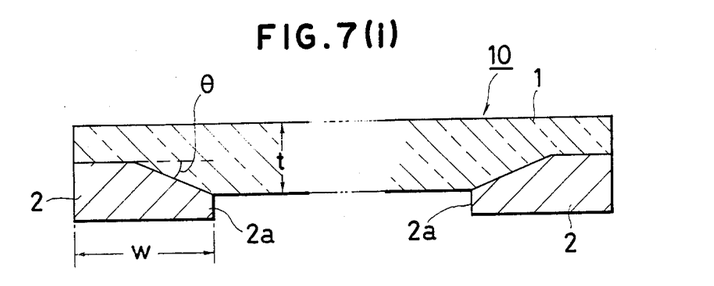
Figure 7J:
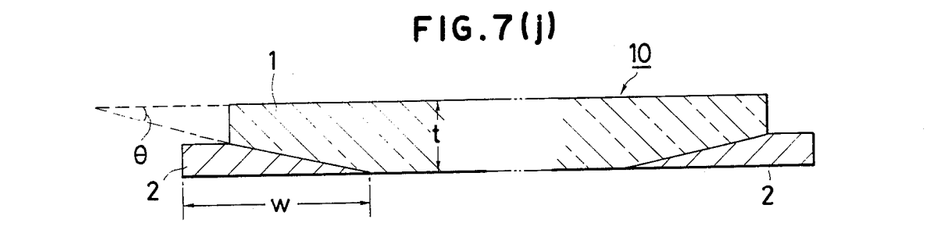
Figure 7K:
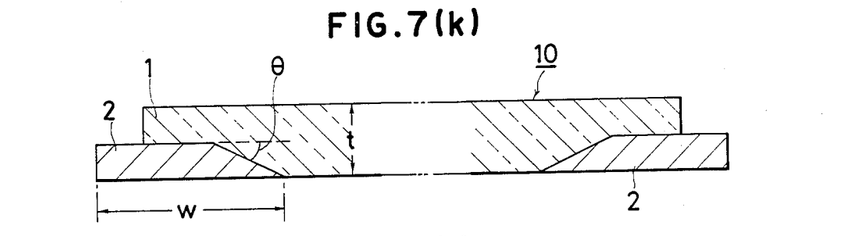
Figure 7L:
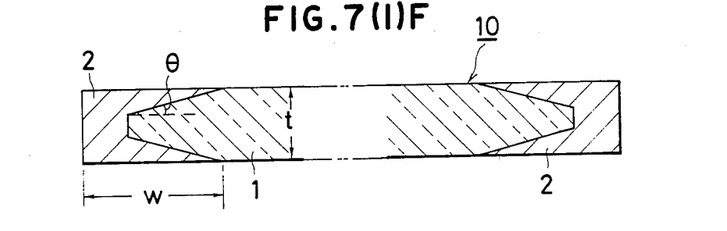

The embodiments of the present invention as shown in FIGS. 7(a), 7(h), and 7(i) are particularly desirable because they have no undercuts and hence they can be made without any lining piece. (Incidentally, a lining piece is necessary if the window glass has the structure as shown in FIGS. 7(d) to 7(g).) The embodiments as shown in FIGS. 7(h) and 7(i) have an advantage that the projection 2a of the colored part 2 can be used as the hook for the interior covering of an automobile at the time of installation.

According to the present invention, the colored part 2 is not specifically limited in width indicated by w in FIGS. 7(a) to 7(l). It is determined according to the size of the window glass 10 and the intended use. Usually it is 5 to 100 mm, preferably 15 to 50 mm.

In the embodiments shown in FIGS. 7(a) to 7(b), the thickness of the transparent part 1 gradually decreases toward the periphery as mentioned above. The angle $\theta$ is not specifically limited; but it is usually 4° to 12°, preferably 4° to 8° so that the colored part 2 is bonded to the transparent part 1 with a sufficiently large adhered surface area.

If the angle $\theta$ is smaller than 4° in the case where the transparent part is formed by the primary molding and the colored part is formed by the secondary molding, the cavity for the colored resin (for the secondary molding) is not completely filled. This gives rise to a difference in level at the joint of the two parts. To eliminate the short shot, it is necessary to increase the injection pressure. This in turn poses the following problems.

(1) The resulting molded article has a high residual strain, which causes cracking during the subsequent heat treatment for the hard coating to prevent scratches.

(2) The primary molding is subject to deformation.

By contrast, if the angle $\theta$ is greater than 12°, the primary molding suffers molding defects, which lead to sink marks.

In the structures shown in FIGS. 7(d) to 7(f), the width d of the narrow end of the colored part 2 is determined according to the values of $\theta$ and W. Usually, it is about a quarter of the thickness T of the window glass.

The vehicle window glass of the present invention can be readily produced according to the method of the present invention mentioned above. The configuration of the colored part can be established by selecting a mold of proper design.

In the case of the window glasses as shown in FIGS. 7(a) to 7(b), the transparent part and the colored part can be produced from the above-mentioned materials. The same description as above may be applied to their application area, dimensions, and hard coating treatment.

In FIGS. 7(a) to 7(l), the window glasses of the present invention are schematically shown as if they were flat. However, needless to say, the method of the present invention can be applied to the production of curved window glasses.

As mentioned above, the vehicle window glass of the present invention produces the following effect because it is designed such that the transparent part gradually thins out toward the periphery at the joint between transparent part and the colored part.

(1) There is no great difference in sink at the joint of the two parts and the window glass has the surface of high precision.

(2) For reason mentioned in (1), there is less distortion in reflection and vision at the boundary between the transparent part and the colored part.

(3) The transparent part and the colored part can be bonded to each other with a large area of adherend surface. This contributes to increased bond strength, mechanical strength, and durability.

The invention will be described in more detail with reference to the following examples.

EXAMPLE 1

Figure 8:
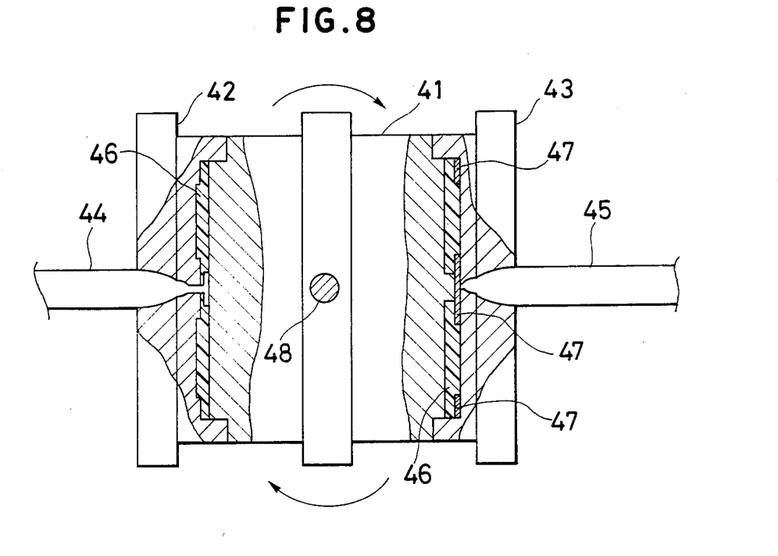
FIG. 8 is a partially sectional front view showing the mold used in Example 1.
Figure 9:
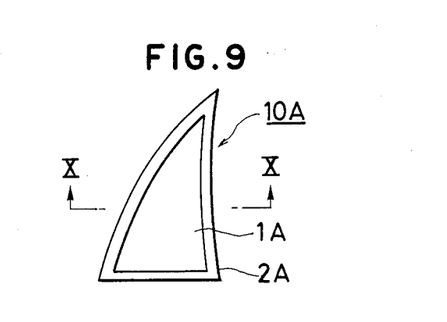
FIG. 9 is a front view of the window glass produced in Example 1.
Figure 10:
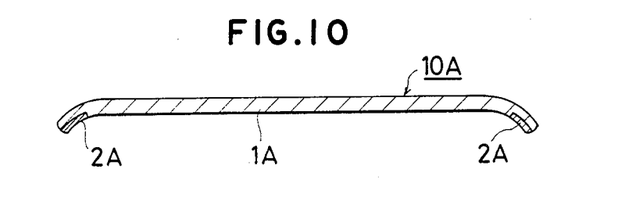
FIG. 10 is a sectional view taken along the line X-X in FIG. 9.

An automotive rear side window glass 10A composed of the transparent part 1A and the colored part 2A as shown in FIG. 10 was produced according to the method of the present invention. The transparent part was produced by the primary molding which was accomplished by injection compression molding, and the colored part was produced by the secondary molding which was accomplished by injection compression molding. The mold used for molding is shown in FIG. 8, in which there are shown the movable half 41, the split mold 42 for the primary molding, the split mold 43 for the secondary molding, the injection nozzles 44 and 45, the transparent part (formed by the primary molding) 46, and the colored part (formed by the secondary molding) 47. The movable half 41 is constructed such that the mold area is turned to the primary mold or secondary mold by the rotation of the shaft 48. The following are the molding materials, molding conditions, and the configuration of the molded product.

Molding materials:
Transparent part: Polycarbonate resin.
Colored part: Polycarbonate resin incorporated with 0.5 wt % of carbon black.
Molding conditions:
Allowance ($D_2$), for injection-compression: 0.2 cm The molding was accomplished in the following sequence.
(1) Clamping of the primary mold.
(2) Injection and compression for the primary molding.
(3) Cooling.
(4) Mold opening.
(5) Reversing of the movable half.
(6) Clamping of the primary and secondary molds.
(7) Injection and compression for the primary molding and the secondary molding.
(8) Cooling.
(9) Mold opening.
(10) Demolding For the second shot and on, the steps of (6) to (10) are repeated.

Configuration of the molded article:
Size: Length: 42 cm
Width: 23 cm
Thickness 0.4 cm
Colored part (values of a and b shown in FIG. 3)
a: 0.2 cm
b: 3 cm The window glass obtained in the example retained the intended shape, without deformation at the time of demolding and post-treatment. In addition, it was free of distorted vision at the boundary between the transparent part and the colored part.

The thus obtained window glass underwent hard coating in the following manner.
Hard coating agent: Silicone-based thermosetting type (with primer treatment).
Coating conditions: at 120° C., for 60 minutes.

The window glass was not subject to deformation by the hard coating and was free of cracking in the vicinity of the gate.

EXAMPLE 2

A window glass as shown in FIG. 7(a) was produced from the same material and under the same conditions as Example 1.

Configuration of the molded article:
Size: Length: 42 cm
Width: 23 cm
Thickness: 0.4 cm
Colored part (values of W and $\theta$ shown in FIG. 7a)
W : 3 cm
$\theta$ : 4°

The thus obtained window glass underwent hard coating in the following manner.
Hard coating agent: Silicone-based thermosetting type (with primer treatment).
Coating conditions: at 120° C., for 60 minutes.

The window glass was not subject to deformation by the hard coating and was free of cracking in the vicinity of the gate.

What is claimed is:

1. A multi colored molded window glass consisting essentially of:
   a central part made of a single layer transparent organic glass, and
   a peripheral part made of colored organic glass with at least one of translucent and opaque properties made of a transparent organic glass material incorporated with a pigment, said peripheral part being securely attached to a periphery of the central part, forming a composite glass, said window glass having characteristics so that the window glass retains original intended shape and has substantially no distortion of vision at a boundary between the central part and the peripheral part and an accurate surface due to uniform sink and shrinkage.

2. A window glass as claimed in claim 1, wherein the colored part is formed only on one of front and rear sides of the window glass.

3. A window glass as claimed in claim 1, wherein the transparent part is made of a thermoplastic resin.

4. A window glass as claimed in claim 1, wherein the colored part is made of polyethylene resin or vinyl chloride resin.

5. A window glass as claimed in claim 1, which has a thickness of 2 to 8 mm.

6. A window glass as claimed in claim 1, wherein the colored part is 0.5 to 2 mm thick and 5 to 30 mm wide.

7. A window glass as claimed in claim 1, wherein the surface is treated with transparent coating harder than the glass.

8. A multi colored molded window glass consisting essentially of:
   a central part made of a single layer transparent organic glass, and
   a peripheral part made of colored organic glass with at least one of translucent and opaque properties made of a transparent organic glass material incorporated with a pigment, said peripheral part and central part overlapping with and securely bonded to each other at a periphery of the central part so that the central part reduces its thickness and said peripheral part increases its thickness toward the periphery of the window glass forming a composite glass, said window glass having characteristics so that the window glass retains original intended shape and has substantially no distortion of vision at a boundary between the central part and the peripheral part and an accurate surface due to uniform sink and shrinkage.

9. A vehicle window glass as claimed in claim 8, wherein said central part overlaps the peripheral part at front and rear sides of the peripheral part to partly form three layers.

10. A vehicle window glass as claimed in claim 8, which is formed from organic glass by the multi-color molding method.

11. A vehicle window glass as claimed in claim 10, wherein at least the transparent part is formed by the injection-compression method.

12. A window glass as claimed in claim 8, wherein the colored part is 5 to 100 mm wide.

13. A window glass as claimed in claim 12, wherein the colored part is 15 to 50 mm wide.

14. A window glass as claimed in claim 8, wherein the transparent part thins out along a slope of 4° to 12°.

15. A window glass as claimed in claim 14, wherein the transparent part thins out along a slope of 4° to 8°.

16. A window glass comprising,
    a central part made of a single layer transparent organic glass, and
    a peripheral part made of colored organic glass with at least one of translucent and opaque properties made of a transparent organic glass material incorporated with a pigment, said peripheral part being integrally connected to a periphery of the central part by injection molding one of the central part and the peripheral part to the other of the central part and the peripheral part, forming a composite glass, said window glass having characteristics so that the window glass retains original intended shape and has substantially no distortion of vision at a boundary between the central part and the peripheral part and an accurate surface due to uniform sink and shrinkage.

* * * * *